United States Patent
Zhak et al.

(10) Patent No.: US 9,172,305 B2
(45) Date of Patent: *Oct. 27, 2015

(54) DC-TO-DC CONVERTER WITH ADAPTIVE DEAD-TIME CONTROL

(71) Applicant: Maxim Integrated Products, Inc., San Jose, CA (US)

(72) Inventors: Serhii M. Zhak, North Andover, MA (US); Brett A. Miwa, Wellesley, MA (US)

(73) Assignee: MAXIM INTEGRATED PRODUCTS, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/594,475

(22) Filed: Jan. 12, 2015

(65) Prior Publication Data

US 2015/0123632 A1 May 7, 2015

Related U.S. Application Data

(63) Continuation of application No. 13/680,364, filed on Nov. 19, 2012, now Pat. No. 8,933,679.

(60) Provisional application No. 61/567,938, filed on Dec. 7, 2011.

(51) Int. Cl.
*H02M 3/158* (2006.01)
*G05F 3/08* (2006.01)
*H02M 1/38* (2007.01)

(52) U.S. Cl.
CPC ............... *H02M 3/158* (2013.01); *G05F 3/08* (2013.01); *H02M 1/38* (2013.01); *H02M 3/1588* (2013.01); *Y02B 70/1466* (2013.01)

(58) Field of Classification Search
CPC ................. H02M 2001/0029; H02M 1/38
USPC ................. 323/222–225, 265–277, 282–285; 363/59–61; 327/536–538
See application file for complete search history.

(56) References Cited

U.S. PATENT DOCUMENTS

| | | | | |
|---|---|---|---|---|
| 5,986,895 A * | 11/1999 | Stewart et al. | ................ | 363/16 |
| 6,396,250 B1 * | 5/2002 | Bridge | ................ | 323/283 |
| 6,614,208 B2 * | 9/2003 | Narita | ................ | 323/283 |
| 7,675,281 B1 * | 3/2010 | Holt et al. | ................ | 323/288 |
| 7,683,594 B2 | 3/2010 | Kim et al. | | |

(Continued)

OTHER PUBLICATIONS

U.S. Appl. No. 14/474,956, filed Sep. 2, 2014, Biondi et al.

(Continued)

*Primary Examiner* — Timothy J Dole
*Assistant Examiner* — Yusef Ahmed

(57) ABSTRACT

A DC-to-DC converter includes first and second switches connected to each other at a node and biased by PWM pulses. A timing module determines a first time difference between a first edge of a first signal at the node and a first edge of a second signal at a control terminal of the first switch, and a second time difference between a second edge of the first signal and a second edge of the second signal. The first and second edges of the second signal correspond to first and second edges of one of the PWM pulses, respectively. A delay module delays the first and second edges of the second signal based on the first and second time differences, respectively. The delay module delays an edge of one of the PWM pulses based on an amount of change in a voltage output by a charge pump.

16 Claims, 12 Drawing Sheets

(56) References Cited

U.S. PATENT DOCUMENTS

| | | | |
|---|---|---|---|
| 7,868,597 B2 | 1/2011 | Dequina | |
| 7,880,454 B2 | 2/2011 | Latham, II et al. | |
| 8,164,320 B2* | 4/2012 | Latham et al. | 323/284 |
| 8,203,321 B2* | 6/2012 | Liang et al. | 323/282 |
| 8,737,101 B2* | 5/2014 | Cho et al. | 363/97 |
| 2001/0045851 A1* | 11/2001 | Saeki | 327/158 |
| 2002/0163986 A1* | 11/2002 | Harrison | 375/374 |
| 2004/0017241 A1* | 1/2004 | Saeki | 327/291 |
| 2004/0189269 A1* | 9/2004 | Lynch | 323/282 |
| 2005/0057228 A1* | 3/2005 | Shih | 323/222 |
| 2005/0099830 A1* | 5/2005 | Jung | 363/59 |
| 2005/0110475 A1* | 5/2005 | Chapuis | 323/282 |
| 2005/0237120 A1* | 10/2005 | Park | 331/16 |
| 2007/0132492 A1* | 6/2007 | Chou | 327/158 |
| 2007/0182390 A1* | 8/2007 | Ishii et al. | 323/282 |
| 2008/0084197 A1* | 4/2008 | Williams et al. | 323/282 |
| 2008/0211473 A1* | 9/2008 | Tlasksl et al. | 323/283 |
| 2008/0298101 A1* | 12/2008 | Kim et al. | 363/84 |
| 2009/0295350 A1* | 12/2009 | Yamada | 323/282 |
| 2010/0085118 A1* | 4/2010 | Chiu | 330/251 |
| 2011/0241633 A1* | 10/2011 | Herzer et al. | 323/271 |
| 2012/0019287 A1* | 1/2012 | Brumett et al. | 327/109 |
| 2012/0032657 A1* | 2/2012 | Dequina | 323/271 |
| 2013/0033248 A1* | 2/2013 | Granger | 323/288 |
| 2013/0147458 A1 | 6/2013 | Zhak et al. | |

OTHER PUBLICATIONS

Trescases, Oliver; Ng, Wai Tung, "Variable Output, Soft-Switching DC/DC Converter for VLSI Dynamic Voltage Scaling Power Supply Applications," 2004 35th Annual IEEE Power Electronics Specialists Conference, vol. 6, pp. 4149-4155, dated 2004.

* cited by examiner

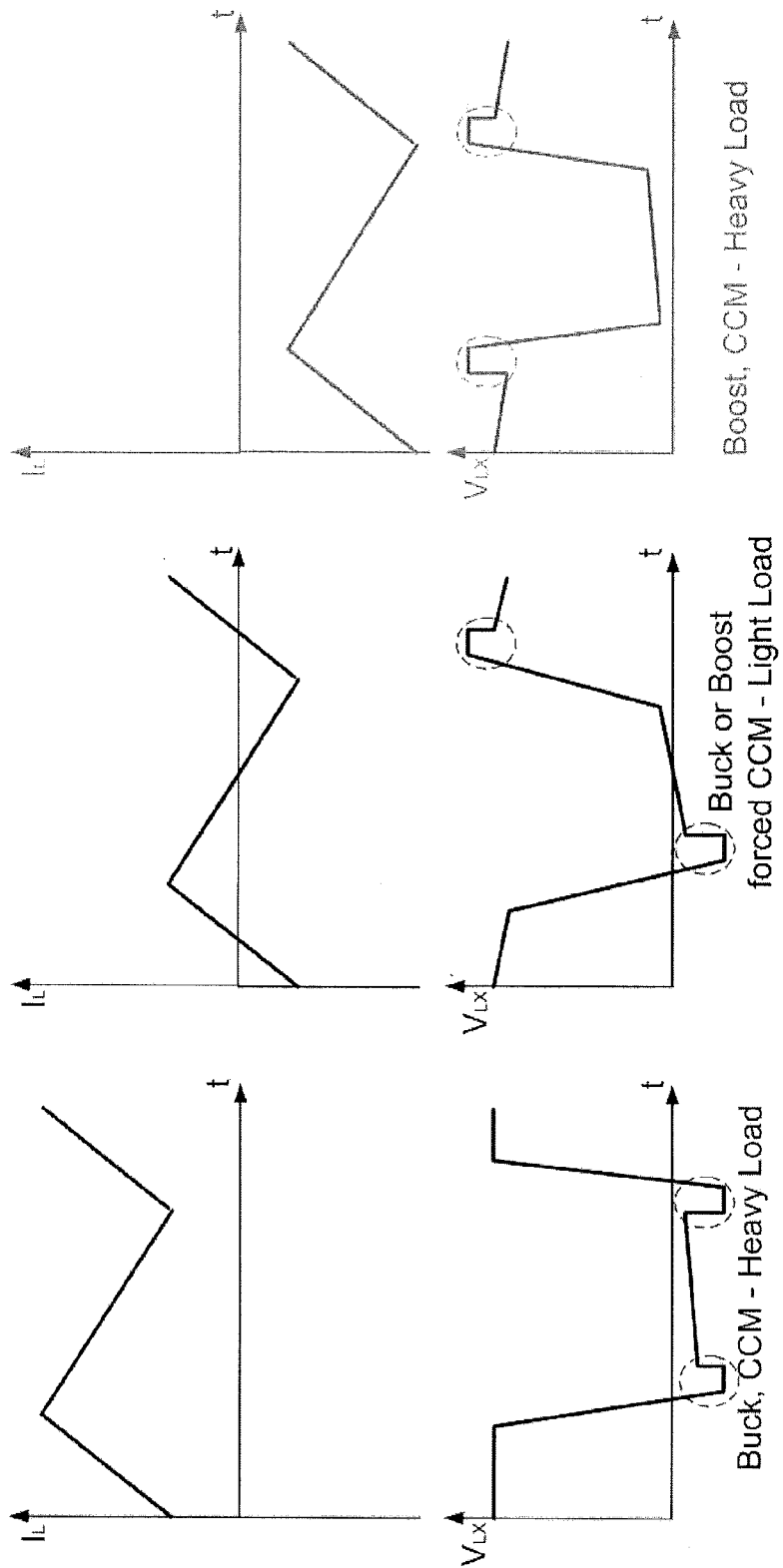

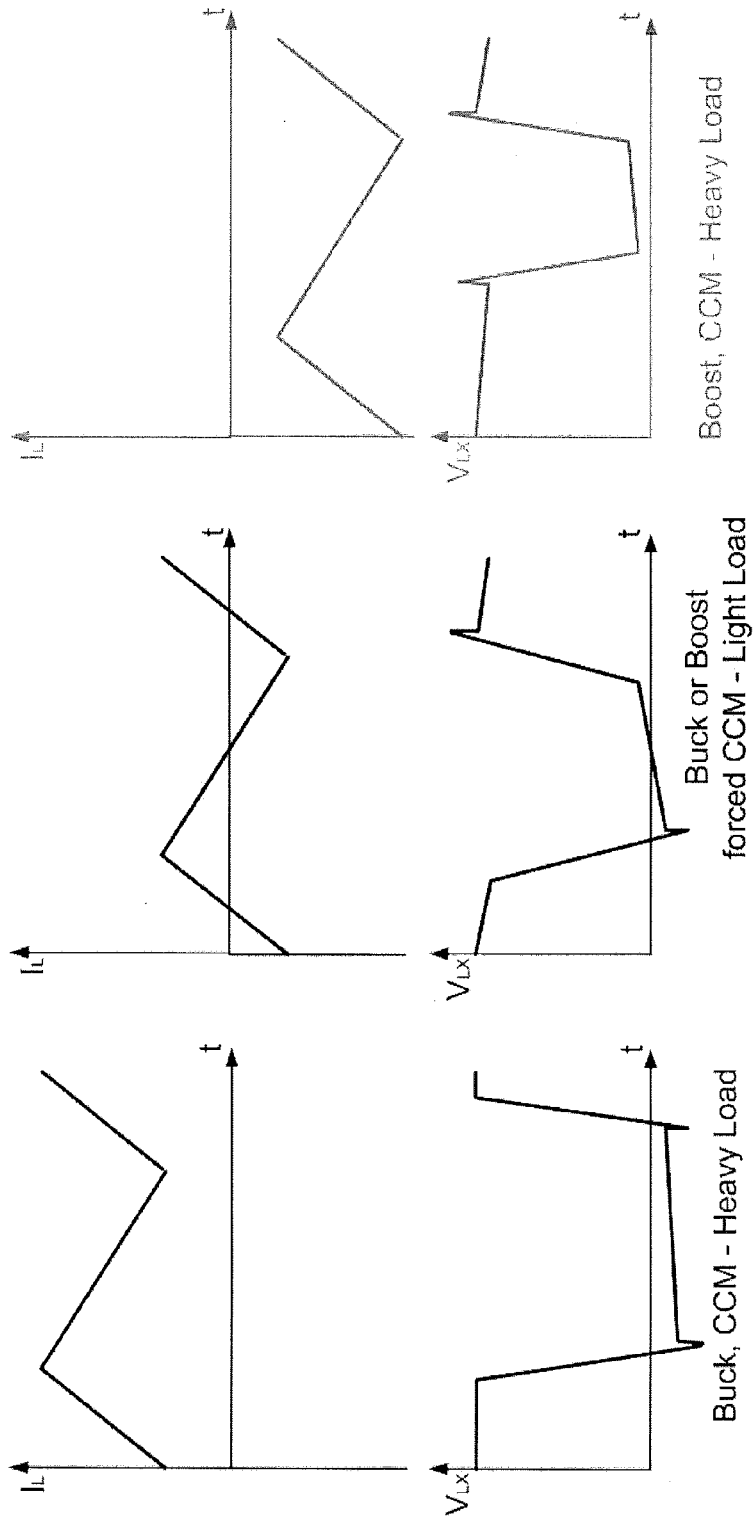

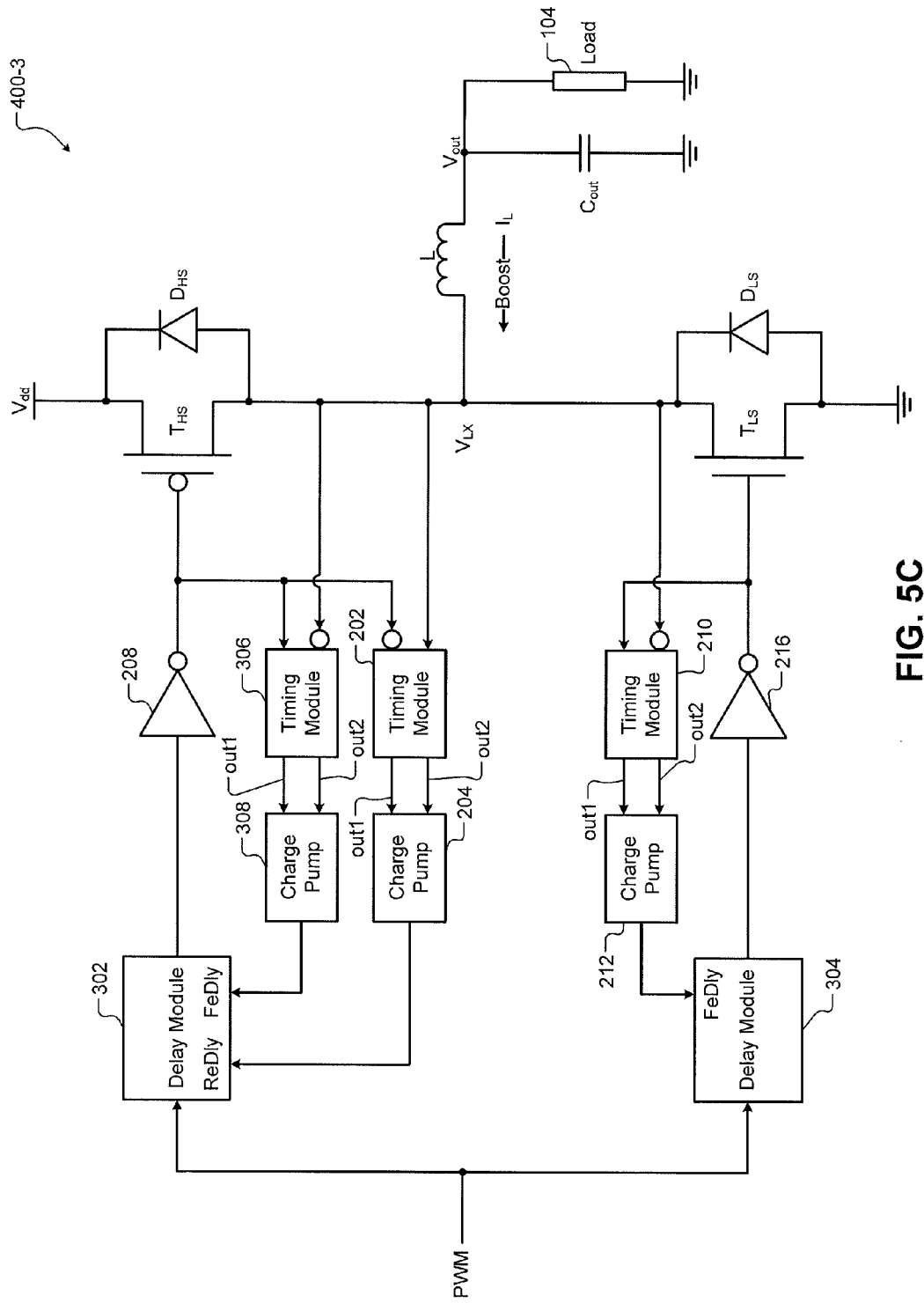

DC-TO-DC CONVERTER WITH ADAPTIVE DEAD-TIME CONTROL

CROSS-REFERENCE TO RELATED APPLICATIONS

This application is a continuation of U.S. patent Ser. No. 13/680,364 filed Nov. 19, 2012, which claims the benefit of U.S. Provisional Application No. 61/567,938 filed on Dec. 7, 2011. The disclosures of the above applications are incorporated herein by reference in their entirety.

FIELD

The present disclosure relates generally to DC-to-DC voltage converters and more particularly to dead-time control in DC-to-DC voltage converters.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIGS. 1A and 1B, a DC-to-DC converter (hereinafter converter) 100 is shown. In FIG. 1A, the converter 100 includes a control module 102, a dead time control module 103, a high-side switch $T_{HS}$, a low-side switch $T_{LS}$, an inductor L, a capacitor $C_{out}$, and a load 104. The high-side switch $T_{HS}$ and the low-side switch $T_{LS}$ (collectively switches) are connected in series. The control module 102 generates PWM pulses that control on and off times of the switches. The dead time control module 103 controls dead times of the switches (explained below). The inductor L is connected to a junction of the switches and is connected in series with the capacitor $C_{out}$ as shown. The load 104 is connected in parallel to the capacitor $C_{out}$ as shown. The converter 100 receives an input voltage $V_{dd}$ and outputs an output voltage $V_{out}$ across the load 104.

In FIG. 1B, an inductor current $I_L$ increases when the high-side switch $T_{HS}$ is turned on while the low-side switch $T_{LS}$ is turned off and decreases when the high-side switch $T_{HS}$ is turned off while the low-side switch $T_{LS}$ is turned on. A voltage $V_{LX}$ at the junction of the switches varies with time t as shown in FIG. 1B. A time interval between opening (i.e., turning off) one switch (e.g., the high-side switch $T_{HS}$) and closing (i.e., turning on) another switch (e.g., the low-side switch $T_{LS}$) is called a dead-time and is shown by dotted circles in FIG. 1B. Body diodes $D_{HS}$ and $D_{LS}$, which are respectively integrated with the high-side switch $T_{HS}$ and the low-side switch $T_{LS}$, conduct during dead times causing power loss. Power loss also occurs due to reverse recovery. Power losses due to conduction of the body diodes and reverse recovery are pronounced at high switching frequencies of the PWM pulses and low output voltages ($V_{out}$) of the converter. The dead times therefore need to be minimized to reduce the power losses.

Referring now to FIGS. 2A-2C, different modes of operation of a converter and corresponding dead times are shown. For example, in FIG. 2A, the converter operates in a Buck continuous conduction mode (CCM) with a heavy load, where the inductor current $I_L$ is always positive. In FIG. 2B, the converter operates in a Buck or Boost forced CCM with a light load, where the inductor current $I_L$ can be positive and negative. In FIG. 2C, the converter operates in a Boost CCM with a heavy load, where the inductor current $I_L$ is always negative. In each mode, the dead times shown need to be minimized to reduce the power losses.

SUMMARY

A DC-to-DC converter shown in FIG. 5A includes first and second transistors each driven by pulse-width modulated (PWM) pulses and each having first and second terminals and a control terminal. The first terminal of the first transistor is connected to a supply voltage, the second terminal of the first transistor and the first terminal of the second transistor are connected to a node, the second terminal of the second transistor is connected to ground, and the node is connected to an inductance that is connected in series to a load. A first timing module determines a first time difference between a first edge of a first signal at the node and a first edge of a second signal at the control terminal of the first transistor. The first edge of the second signal corresponds to a first edge of one of the PWM pulses. A second timing module determines a second time difference between a second edge of the first signal at the node and a second edge of the second signal at the control terminal of the first transistor. The second edge of the second signal corresponds to a second edge of the one of the PWM pulses. A delay module delays the first edge of the second signal at the control terminal of the first transistor based on the first time difference and delays the second edge of the second signal at the control terminal of the first transistor based on the second time difference.

A DC-to-DC converter shown in FIG. 5B includes first and second transistors each driven by pulse-width modulated (PWM) pulses and each having first and second terminals and a control terminal. The first terminal of the first transistor is connected to a supply voltage, the second terminal of the first transistor and the first terminal of the second transistor are connected to a node, the second terminal of the second transistor is connected to ground, and the node is connected to an inductance that is connected in series to a load. A first timing module determines a first time difference between a first edge of a first signal at the node and a first edge of a second signal at the control terminal of the second transistor. The first edge of the second signal corresponds to a first edge of one of the PWM pulses. A second timing module determines a second time difference between a second edge of the first signal at the node and a second edge of the second signal at the control terminal of the second transistor. The second edge of the second signal corresponds to a second edge of the one of the PWM pulses. A delay module delays the first edge of the second signal at the control terminal of the second transistor based on the first time difference and delays the second edge of the second signal at the control terminal of the second transistor based on the second time difference.

A DC-to-DC converter shown in FIG. 5C includes first and second transistors each driven by pulse-width modulated (PWM) pulses and each having first and second terminals and a control terminal. The first terminal of the first transistor is connected to a supply voltage, the second terminal of the first transistor and the first terminal of the second transistor are connected to a node, the second terminal of the second transistor is connected to ground, and the node is connected to an inductance that is connected in series to a load. A first timing module determines a first time difference between a first edge of a first signal at the node and a first edge of a second signal at the control terminal of the first transistor. The first edge of the second signal corresponds to a first edge of one of the PWM pulses. A second timing module determines a second time difference between a second edge of the first signal at the node and a second edge of the second signal at the control terminal of the first transistor. The second edge of the second signal corresponds to a second edge of the one of the PWM pulses. A third timing module determines a third time difference between the first edge of the first signal at the node and a first edge of a third signal at the control terminal of the second transistor. The first edge of the third signal corresponds to the first edge of the one of the PWM pulses. A first delay module delays the first edge of the second signal at the control terminal of the first transistor based on the first time difference and delays the second edge of the second signal at the control terminal of the first transistor based on the second time difference. A second delay module delays the first edge of the third signal at the control terminal of the second transistor based on the third time difference and does not delay a second edge of the third signal at the control terminal of the second transistor, wherein the second edge of the third signal corresponds to the second edge of the one of the PWM pulses.

A DC-to-DC converter shown in FIG. 5D includes first and second transistors each driven by pulse-width modulated (PWM) pulses and each having first and second terminals and a control terminal. The first terminal of the first transistor is connected to a supply voltage, the second terminal of the first transistor and the first terminal of the second transistor are connected to a node, the second terminal of the second transistor is connected to ground, and the node is connected to an inductance that is connected in series to a load. A first timing module determines a first time difference between a first edge of a first signal at the node and a first edge of a second signal at the control terminal of the first transistor. The first edge of the second signal corresponds to a first edge of the one of the PWM pulses. A second timing module determines a second time difference between the first edge of the first signal at the node and a first edge of a third signal at the control terminal of the second transistor. The first edge of the third signal corresponds to the first edge of the one of the PWM pulses. A third timing module determines a third time difference between a second edge of the first signal at the node and a second edge of the third signal at the control terminal of the second transistor. The second edge of the third signal corresponds to a second edge of the one of the PWM pulses. A first delay module delays the first edge of the second signal at the control terminal of the first transistor based on the first time difference and does not delay a second edge of the second signal at the control terminal of the first transistor. The second edge of the second signal corresponds to the second edge of the one of the PWM pulses. A second delay module delays the first edge of the third signal at the control terminal of the second transistor based on the second time difference and delays the second edge of the third signal at the control terminal of the second transistor based on the third time difference.

A DC-to-DC converter shown in FIG. 4A includes first and second transistors each driven by pulse-width modulated (PWM) pulses and each having first and second terminals and a control terminal. The first terminal of the first transistor is connected to a supply voltage, the second terminal of the first transistor and the first terminal of the second transistor are connected to a node, the second terminal of the second transistor is connected to ground, and the node is connected to an inductance that is connected in series to a load. A first timing module determines a first time difference between a first edge of a first signal at the node and a first edge of a second signal at the control terminal of the first transistor. The first edge of the second signal corresponds to a first edge of one of the PWM pulses. A second timing module determines a second time difference between a second edge of the first signal at the node and a second edge of the second signal at the control terminal of the first transistor. The second edge of the second signal corresponds to a second edge of the one of the PWM pulses. A third timing module determines a third time difference between the second edge of the first signal at the node and a first edge of a third signal at the control terminal of the second transistor. The first edge of the second signal corresponds to the second edge of the one of the PWM pulses. A fourth timing module determines a fourth time difference between the first edge of the first signal at the node and a second edge of the third signal at the control terminal of the second transistor. The second edge of the third signal corresponds to the first edge of the one of the PWM pulses. A first delay module delays the first edge of the second signal at the control terminal of the first transistor based on the first time difference and delays the second edge of the second signal at the control terminal of the first transistor based on the second time difference. A second delay module delays the first edge of the third signal at the control terminal of the second transistor based on the third time difference and delays the second edge of the third signal at the control terminal of the second transistor based on the fourth time difference.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 2A depicts graphs of $I_L$ and $V_{LX}$ as functions of time for a DC-to-DC converter operating in a Buck continuous conduction mode (CCM) with a heavy load;

FIG. 2B depicts graphs of $I_L$ and $V_{LX}$ as functions of time for a DC-to-DC converter operating in a Buck or Boost forced continuous conduction mode (CCM) with a light load;

FIG. 2C depicts graphs of $I_L$ and $V_{LX}$ as functions of time for a DC-to-DC converter operating in a Boost continuous conduction mode (CCM) with a heavy load;

FIG. 4B depicts graphs of $I_L$ and $V_{LX}$ as functions of time for the DC-to-DC converter of FIG. 4A operating in a Buck continuous conduction mode (CCM) with a heavy load;

FIG. 4C depicts graphs of $I_L$ and $V_{LX}$ as functions of time for the DC-to-DC converter of FIG. 4A operating in a Buck or Boost forced continuous conduction mode (CCM) with a light load;

FIG. 4D depicts graphs of $I_L$ and $V_{LX}$ as functions of time for the DC-to-DC converter of FIG. 4A operating in a Boost continuous conduction mode (CCM) with a heavy load;

FIG. 5C is a schematic of a DC-to-DC converter according to the present disclosure that reduces dead times in Boost mode using two feedback loops for a high-side switch of the converter and one feedback loop for a low-side switch of the converter;

DETAILED DESCRIPTION

Figures 1A, 1B:
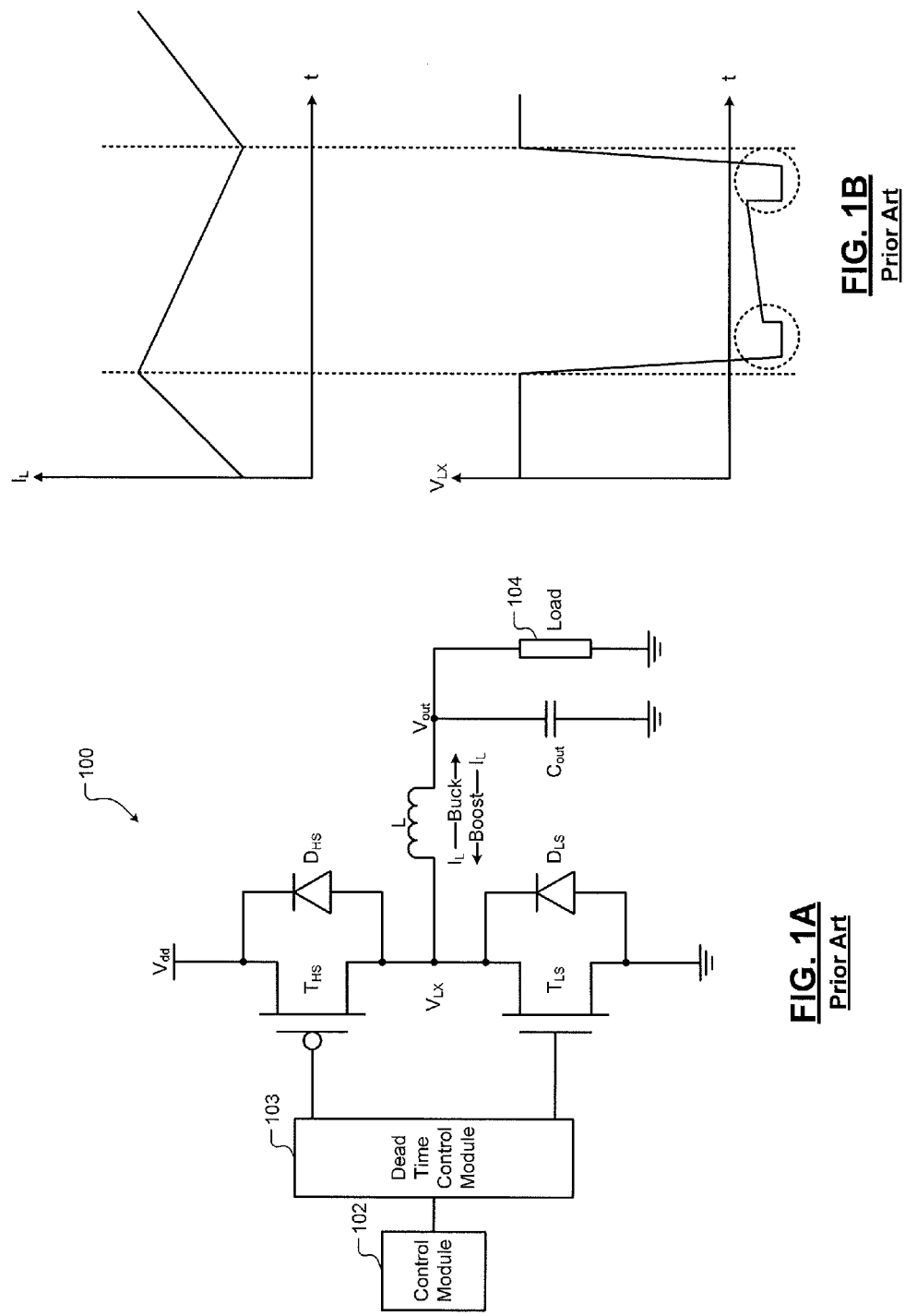
FIG. 1A is a schematic of a DC-to-DC converter according to the prior art.
FIG. 1B depicts graphs of an inductor current ($I_L$) and a voltage ($V_{LX}$) at a junction of switches of the DC-to-DC converter as functions of time according to the prior art.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure relates to reducing dead times (i.e., conduction times of body diodes of high and low side drivers) of DC-to-DC converters. Specifically, the present disclosure relates to reducing the dead times in various modes of operation of the DC-to-DC converters irrespective of load conditions. For example, the dead times can be reduced according to the present disclosure in DC-to-DC converters operating in Buck continuous conduction mode (CCM) with a heavy load, Buck or Boost forced CCM with a light load, and Boost CCM with a heavy load.

One way to reduce the dead times is to prevent the body diodes from conducting and turning on the high-side switch $T_{HS}$ or the low-side switch $T_{LS}$ before the respective body diodes can conduct. Accordingly, the load current $I_L$ will flow through the high-side switch $T_{HS}$ or the low-side switch $T_{LS}$ instead of flowing through the respective body diodes.

Figure 3A:
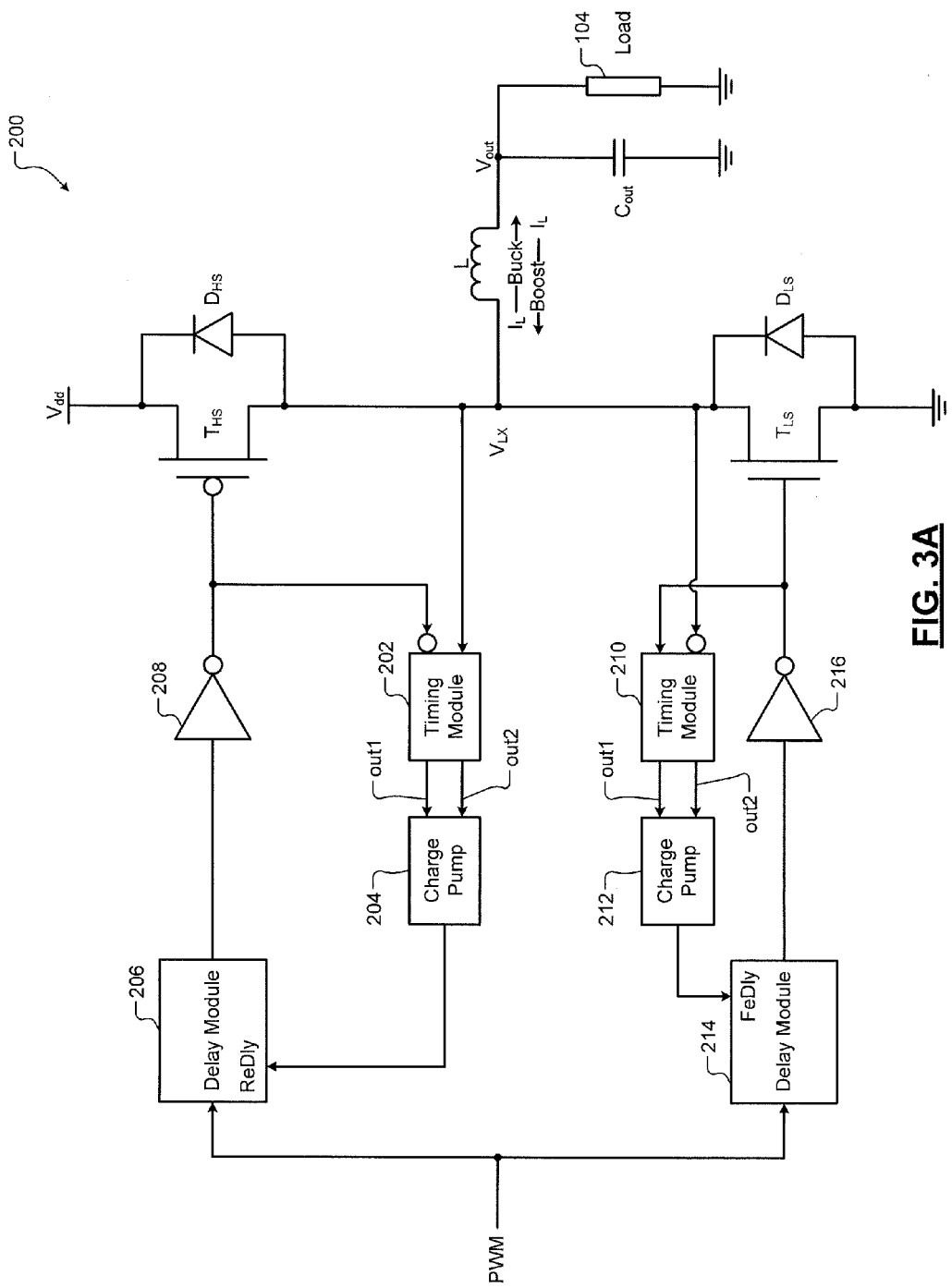
FIG. 3A is a schematic of a DC-to-DC converter that reduces dead times in Buck or Boost forced continuous conduction mode (CCM) with a light load.

Referring now to FIGS. 3A-3D, a DC-to-DC converter (hereinafter converter) 200 that reduces dead times in Buck or Boost forced CCM with a light load is shown. In FIG. 3A, the converter 200 includes the high-side switch $T_{HS}$, the low-side switch $T_{LS}$, the inductor L, the capacitor $C_{out}$, and the load 104. The high-side switch $T_{HS}$ and the low-side switch $T_{LS}$ (collectively switches) are connected in series. The inductor L is connected to the junction of the switches and is connected in series with the capacitor $C_{out}$ as shown. The load 104 is connected in parallel to the capacitor $C_{out}$ as shown. The PWM pulses generated by the PWM module 102 (not shown) control the on and off times of the switches. The converter 200 receives the input voltage $V_{dd}$ and outputs the output voltage $V_{out}$ across the load 104.

To reduce the dead times, the converter 200 further includes a feedback loop for each switch. The feedback loops compare timings of gate and drain voltage transitions of the switches. The feedback loops delay the PWM pulses that are output to the gates of the switches based on the timings to reduce the dead times.

The word transition as used herein means a rising edge or a falling edge of a signal (e.g., a PWM pulse, a voltage, or a current) when the signal begins to rise from a low value or fall from a high value, respectively. Accordingly, a gate turn-on transition for the high-side switch $T_{HS}$ is a falling edge of a gate-to-source voltage of the high-side switch $T_{HS}$ since the high-side switch $T_{HS}$ is shown as a PMOS device. A gate turn-off transition for the high-side switch $T_{HS}$ is a rising edge of the gate-to-source voltage of the high-side switch $T_{HS}$ since the high-side switch $T_{HS}$ is shown as a PMOS device.

Conversely, a gate turn-on transition for the low-side switch $T_{LS}$ is a rising edge of a gate-to-source voltage of the low-side switch $T_{LS}$ since the low-side switch $T_{LS}$ is shown as an NMOS device. A gate turn-off transition for the low-side switch $T_{LS}$ is a falling edge of the gate-to-source voltage of the low-side switch $T_{LS}$ since the low-side switch $T_{LS}$ is shown as an NMOS device. Similarly, a falling $V_{LX}$ transition is a falling edge of the voltage $V_{LX}$, and a rising $V_{LX}$ transition is a rising edge of the voltage $V_{LX}$.

The feedback loop for the high-side switch $T_{HS}$ includes a timing module 202, a charge pump 204, a delay module 206, and an inverting driver 208. The feedback loop for the low-side switch $T_{LS}$ includes a timing module 210, a charge pump 212, a delay module 214, and an inverting driver 216.

The inputs of the delay modules 206 and 214 receive the PWM pulses from the PWM module 102. The delay module 206 delays a rising edge of a PWM pulse (since $T_{HS}$ is a PMOS device) based on an output voltage of the charge pump 204 and propagates a falling edge of a PWM pulse without delay. The inverting driver 208 inverts the output of the delay module 206 and outputs the inverted output of the delay module 206 to the gate of the high-side switch $T_{HS}$. The delay module 214 delays a falling edge of a PWM pulse (since $T_{LS}$ is an NMOS device) based on an output voltage of the charge pump 212 and propagates a rising edge of a PWM pulse without delay. The inverting driver 216 inverts the output of the delay module 214 and outputs the inverted output of the delay module 214 to the gate of the low-side switch $T_{LS}$.

In the feedback loop for the high-side switch $T_{HS}$, the timing module 202 has an inverting input and a non-inverting input. The inverting input is connected to the gate of the high-side switch $T_{HS}$ (since $T_{HS}$ is a PMOS device). The non-inverting input is connected to the junction of the switches. Accordingly, the inverting input senses a falling edge of a gate voltage of the high-side switch $T_{HS}$, and the non-inverting input senses a rising edge of a voltage $V_{LX}$ at the junction of the switches.

Suppose a falling transition of the gate voltage of the high-side switch $T_{HS}$ occurs at time t1, and a rising transition of the voltage $V_{LX}$ occurs at time t2. The timing module 202 has two outputs: out1 and out2. If t1 is before t2, the timing module 202 outputs a pulse having a pulse width (t2-t1) on the output out1, and out2 is low. Conversely, if t2 is before t1, out1 is low, and the timing module 202 outputs a pulse having a pulse width (t1-t2) on the output out2.

The charge pump 204 has two inputs that respectively receive the outputs out1 and out2 of the timing module 202, and an output that outputs a voltage that increases or decreases based on the outputs out1 and out2 of the timing module 202. For example, the output voltage of the charge pump 204 increases when the timing module 202 outputs a pulse on the output out1 and decreases when the timing module 202 outputs a pulse on the output out2. The amount by which the output of the charge pump increases or decreases depends respectively on the pulse widths on the outputs out1 and out2.

The delay module 206 delays a rising edge of a PWM pulse. The amount of delay is based on the output of the charge pump 204. For example, the delay increases or decreases based on whether the output of the charge pump 204 increases or decreases. Further, the amount by which the delay increases or decreases depends on the amount by which the output of the charge pump 204 increases or decreases. The inverting driver 208 inverts the output of the delay module 206 and outputs the inverted output of the delay module 206 to the gate of the high-side switch $T_{HS}$.

In the feedback loop for the low-side switch $T_{LS}$, the non-inverting input of the timing module 210 is connected to the gate of the low-side switch $T_{LS}$ (since $T_{LS}$ is an NMOS device). The inverting input is connected to the junction of the switches. Accordingly, the non-inverting input senses a rising edge of a gate voltage of the low-side switch $T_{LS}$, and the inverting input senses a falling edge of the voltage $V_{LX}$ at the junction of the switches.

Suppose a falling transition of the voltage $V_{LX}$ occurs at time t1, and a rising transition of the gate voltage of the low-side switch $T_{LS}$ occurs at time t2. The timing module 210 has two outputs: out1 and out2. If t2 is before t1, the timing module 210 outputs a pulse having a pulse width (t1-t2) on the output out1, and out2 is low. If t1 is before t2, out1 is low, and the timing module 210 outputs a pulse having a pulse width (t2-t1) on the output out2.

The charge pump 212 has two inputs that respectively receive the outputs out1 and out2 of the timing module 210, and an output that outputs a voltage that increases or decreases based on the outputs out1 and out2 of the timing module 210. For example, the output voltage of the charge pump 212 increases when the timing module 210 outputs a pulse on the output out1 and decreases when the timing module 210 outputs a pulse on the output out2. The amount by which the output of the charge pump increases or decreases depends respectively on the pulse widths of the outputs out1 and out2.

The delay module 214 delays a falling edge of a PWM pulse. The amount of delay is based on the output of the charge pump 212. For example, the delay increases or decreases based on whether the output of the charge pump 212 increases or decreases. Further, the amount by which the delay increases or decreases depends on the amount by which the output of the charge pump 212 increases or decreases. The inverting driver 216 inverts the output of the delay module 214 and outputs the inverted output of the delay module 214 to the gate of the low-side switch $T_{LS}$.

In use, when the high-side switch $T_{HS}$ is off and the low-side switch $T_{LS}$ is on, a rising edge of a PWM pulse is output to turn on the high-side switch $T_{HS}$. The delay modules 206 and 214 receive the rising edge of the PWM pulse. The delay module 214 propagates the rising edge of the PWM pulse without delay. The inverting driver 216 outputs a falling edge to the gate of the low-side switch $T_{LS}$, which turns off the low-side switch $T_{LS}$. If the inductor current flows into the junction of the switches at that time, the voltage $V_{LX}$ starts to increase.

The timing module 202 senses a time difference between a time at which the voltage $V_{LX}$ has risen and a time at which the gate-to-source voltage of the high-side switch $T_{HS}$ transitions and begins to fall (i.e., the gate turn-on transition of the high-side switch $T_{HS}$). The delay module 206 delays the gate turn-on transition of the high-side switch $T_{HS}$ based on the time difference to reduce this time difference, i.e., the dead time.

Conversely, when the high-side switch $T_{HS}$ is on and the low-side switch $T_{LS}$ is off, a falling edge of a PWM pulse is output to turn off the high-side switch $T_{HS}$. The delay modules 206 and 214 receive the falling edge of the PWM pulse. The delay module 206 propagates the falling edge of the PWM pulse without delay. The inverting driver 208 outputs a rising edge to the gate of the high-side switch $T_{HS}$, which turns off the high-side switch $T_{HS}$. If the inductor current flows out of the junction of the switches at that time, the voltage $V_{LX}$ starts to decrease.

The timing module 210 senses a time difference between a time at which the voltage $V_{LX}$ has fallen and a time at which the gate-to-source voltage of the low-side switch $T_{LS}$ transitions and begins to rise (i.e., the gate turn-on transition of the low-side switch $T_{LS}$). The delay module 214 delays the gate turn-on transition of the low-side switch $T_{LS}$ based on the time difference to reduce this time difference, i.e., the dead time.

Figures 3B, 3C, 3D:
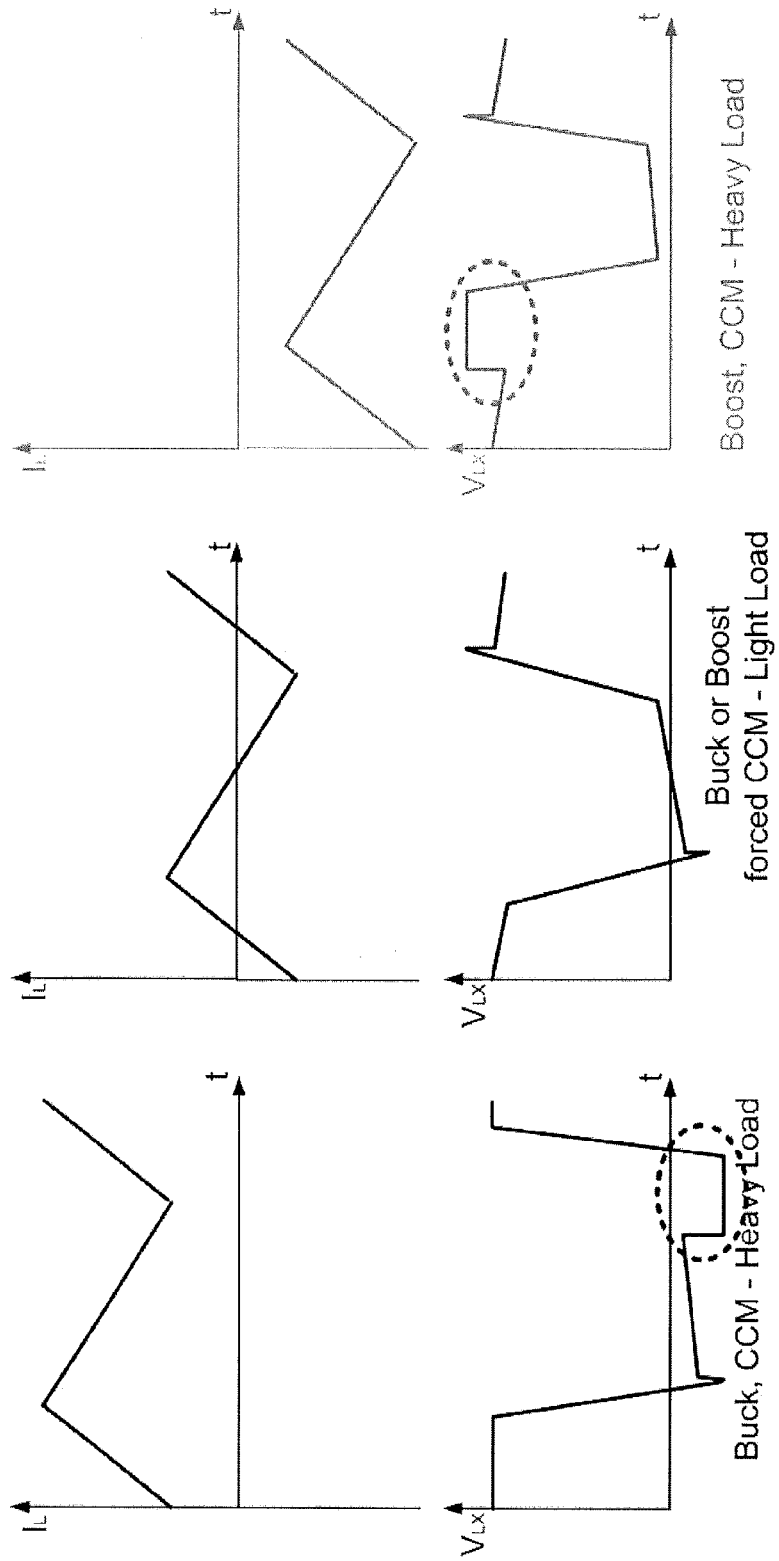
FIG. 3B depicts graphs of $I_L$ and $V_{LX}$ as functions of time for the DC-to-DC converter of FIG. 3A operating in a Buck continuous conduction mode (CCM) with a heavy load.
FIG. 3C depicts graphs of $I_L$ and $V_{LX}$ as functions of time for the DC-to-DC converter of FIG. 3A operating in a Buck or Boost forced continuous conduction mode (CCM) with a light load.
FIG. 3D depicts graphs of $I_L$ and $V_{LX}$ as functions of time for the DC-to-DC converter of FIG. 3A operating in a Boost continuous conduction mode (CCM) with a heavy load.

The delays generated by the delay modules 206 and 214 adjust (reduce) the dead times as shown in FIG. 3C. The delays, however, reduce the dead times only when the converter 200 operates in Buck or Boost CCM with a light load. The delays increase the dead times when the inductor current flows only out of the junction of the switches (i.e., when the converter 200 operates in Buck CCM with a heavy load) as shown in FIG. 3B and when the inductor current flows only into the junction of the switches (i.e., when the converter 200 operates in Boost CCM with a heavy load) as shown in FIG. 3D.

Referring now to FIGS. 4A-4D, a converter 300 that reduces dead times in various modes is shown. The converter 300 reduces dead times irrespective of load conditions. For example, the converter 300 reduces dead times when operating in Buck CCM with a heavy load, Buck or Boost forced CCM with a light load, and Boost CCM with a heavy load.

Figure 4A:
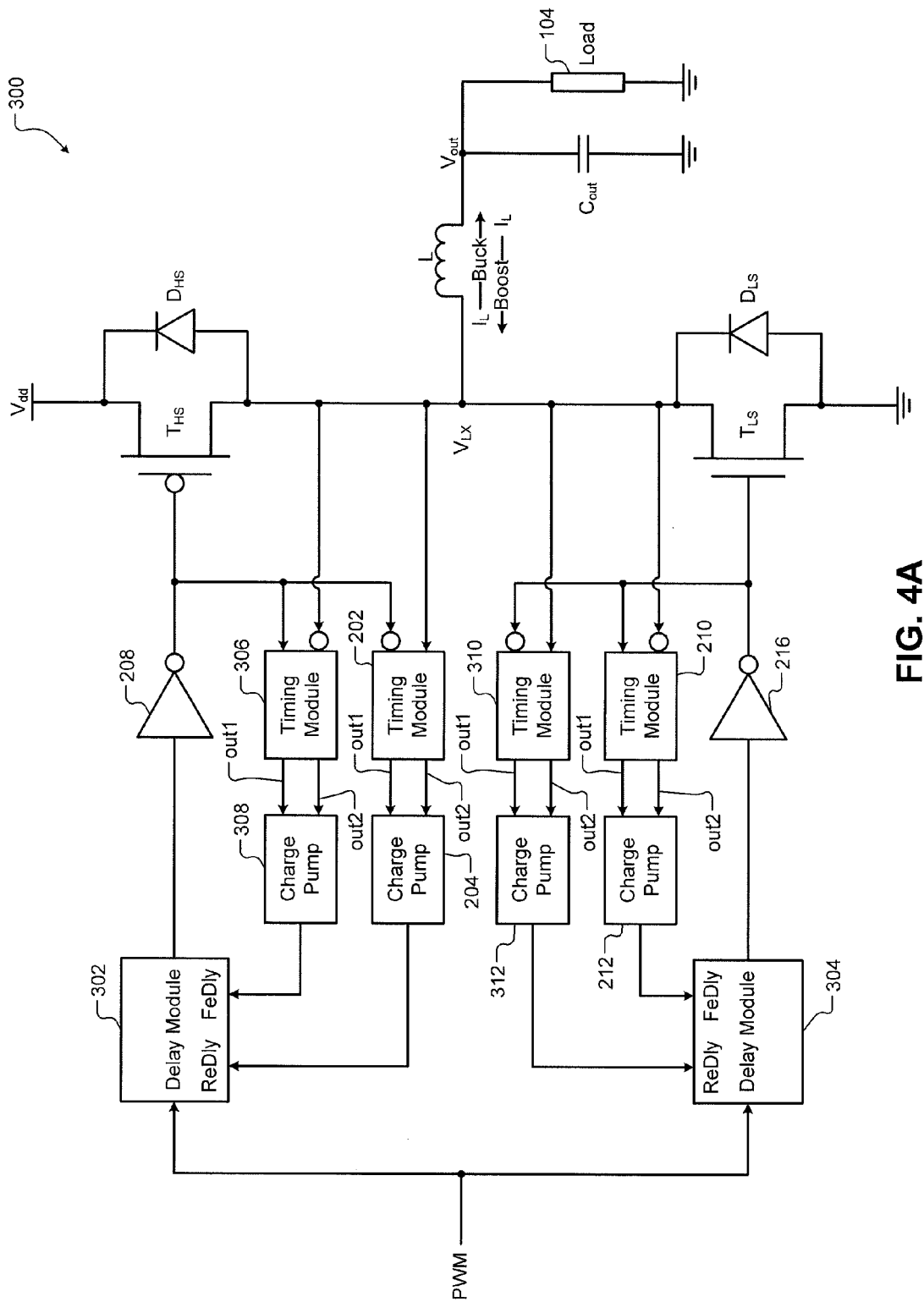
FIG. 4A is a schematic of a DC-to-DC converter according to the present disclosure that reduces dead times in various modes including Buck CCM with a heavy load, Buck or Boost forced CCM with a light load, and Boost CCM with a heavy load.

In FIG. 4A, the converter 300 includes all of the components of the converter 200 shown in FIG. 3A except the delay modules 206 and 214. The converter 300 further includes an additional feedback loop for the high-side switch $T_{HS}$ comprising a timing module 306 and a charge pump 308 and an additional feedback loop for the low-side switch $T_{LS}$ comprising a timing module 310 and a charge pump 312. The converter 300 also includes a delay module 302 for the high-side switch $T_{HS}$ and a delay module 304 for the low-side switch $T_{LS}$. The inputs of the delay modules 302 and 304 receive the PWM pulses from the PWM module 102.

The delay module 302 delays a rising edge of a PWM pulse based on the output of the timing module 202 and the charge pump 204 and delays a falling edge of a PWM pulse based on an output of the timing module 306 and the charge pump 308. The delay module 304 delays a falling edge of a PWM pulse based on the output of the timing module 210 and the charge pump 212 and delays a rising edge of a PWM pulse based on an output of the timing module 310 and the charge pump 312.

The connections and functions of the timing module 202, the charge pump 204, the timing module 210, and the charge pump 212 are the same as in the converter 200. The connections and functions of the timing module 306, the charge pump 308, the timing module 310, and the charge pump 312 are as follows.

In the feedback loop for the high-side switch $T_{HS}$, the timing module 306 has an inverting input and a non-inverting input. The inverting input is connected to the junction of the switches, and the non-inverting input is connected to the gate of the high-side switch $T_{HS}$. Accordingly, the inverting input senses a falling edge of the voltage $V_{LX}$ at the junction of the switches, and the non-inverting input senses a rising edge of the gate voltage of the high-side switch $T_{HS}$.

Suppose a rising transition of the gate voltage of the high-side switch $T_{HS}$ occurs at time t1, and a falling transition of the voltage $V_{LX}$ occurs at time t2. The timing module 306 has two outputs: out1 and out2. If t1 is before t2, the timing module 306 outputs a pulse having a pulse width (t2-t1) on the output out1, and out2 is low. Conversely, if t2 is before t1, out1 is low, and the timing module 306 outputs a pulse having a pulse width (t1-t2) on the output out2.

The charge pump 308 has two inputs that respectively receive the outputs out1 and out2 of the timing module 306, and an output that outputs a voltage that increases or decreases based on the outputs out1 and out2 of the timing module 306. For example, the output voltage of the charge pump 308 increases when the timing module 306 outputs a pulse on the output out1 and decreases when the timing module 306 outputs a pulse on the output out2. The amount by which the output of the charge pump increases or decreases depends respectively on the pulse widths on the outputs out1 and out2.

The delay module 302 delays a falling edge of a PWM pulse by an amount based on the output of the charge pump 308. For example, the delay increases or decreases based on whether the output of the charge pump 308 increases or decreases. Further, the amount by which the delay increases or decreases depends on the amount by which the output of the charge pump 308 increases or decreases. The inverting driver 208 inverts the output of the delay module 302 and outputs the inverted output of the delay module 302 to the gate of the high-side switch $T_{HS}$.

In the feedback loop for the low-side switch $T_{LS}$, the inverting input of the timing module 310 is connected to the gate of the low-side switch $T_{LS}$, and the non-inverting input is connected to the junction of the switches. Accordingly, the inverting input senses a falling edge of the gate voltage of the low-side switch $T_{LS}$, and the non-inverting input senses a rising edge of the voltage $V_{LX}$ at the junction of the switches.

Suppose a falling transition of the gate voltage of the low-side switch $T_{LS}$ occurs at time t1 and a rising transition of the voltage $V_{LX}$ occurs at time t2. The timing module 310 has two outputs: out1 and out2. If t1 is before t2, the timing module 310 outputs a pulse having a pulse width (t2-t1) on the output out1, and out2 is low. If t2 is before t1, out1 is low, and the timing module 310 outputs a pulse having a pulse width (t1-t2) on the output out2.

The charge pump 312 has two inputs that respectively receive the outputs out1 and out2 of the timing module 310, and an output that outputs a voltage that increases or decreases based on the outputs out1 and out2 of the timing module 310. For example, the output voltage of the charge pump 312 increases when the timing module 310 outputs a pulse on the output out1 and decreases when the timing module 310 outputs a pulse on the output out2. The amount by which the output of the charge pump increases or decreases depends respectively on the pulse widths of the outputs out1 and out2.

The delay module 304 delays a rising edge of a PWM pulse by an amount based on the output of the charge pump 312. For example, the delay increases or decreases based on whether the output of the charge pump 312 increases or decreases. Further, the amount by which the delay increases or decreases depends on the amount by which the output of the charge pump 312 increases or decreases. The inverting driver 216 inverts the output of the delay module 304 and outputs the inverted output of the delay module 304 to the gate of the low-side switch $T_{LS}$.

In use, when a rising edge of the PWM pulse is received, the delay module 302 delays the rising edge according to the feedback received from the timing module 202 and the charge pump 204, and the delay module 304 delays the rising edge according to the feedback received from the timing module 310 and the charge pump 312. When a falling edge of the PWM pulse is received, the delay module 302 delays the falling edge according to the feedback received from the timing module 306 and the charge pump 308, and the delay module 304 delays the falling edge according to the feedback received from the timing module 210 and the charge pump 212.

For example, suppose that the high-side switch $T_{HS}$ is off, the low-side switch $T_{LS}$ is on, and the delay modules 302 and 304 receive a rising edge of the PWM pulse to turn on the high-side switch $T_{HS}$. Suppose also that the inductor current $I_L$ flows out of the junction of the switches at that time. Since the rising edge of the PWM pulse turns on the high-side switch $T_{HS}$, the rising edge of the PWM pulse may be called a turn-on transition of the converter 300.

In the feedback loop of the high-side switch $T_{HS}$, the gate-to-source voltage of the high-side switch $T_{HS}$ falls before the voltage $V_{LX}$ can rise. Accordingly, at the inputs of the timing module 202, time t1 at which the gate-to-source voltage of the high-side switch $T_{HS}$ starts falling is before time t2 at which the voltage $V_{LX}$ starts rising. In other words, the gate turn-on transition of the high-side switch $T_{HS}$ occurs earlier than a rising $V_{LX}$ transition. The output out1 of the timing module 202 outputs a pulse of pulse width (t2-t1) at the output out1, and the output out2 of the timing module 202 is low. The output voltage of the charge pump 204 increases proportionally to the pulse width (t2-t1). The delay module 302 delays the rising edge of the PWM pulse proportionally to the increase in the output voltage of the charge pump 204. The process continues until the output voltage of the charge pump 204 rails at $V_{dd}$. The amount of delay continues to increase and reaches a maximum value when the output voltage of the charge pump 204 rails at $V_{dd}$. At this point the feedback loop of the high-side switch $T_{HS}$ is saturated.

In the feedback loop of the low-side switch $T_{LS}$, the gate-to-source voltage of the low-side switch $T_{LS}$ is falling, and the voltage $V_{LX}$ is rising. Suppose that at the inputs of the timing module 310, time t1 at which the gate-to-source voltage of the high-side switch $T_{HS}$ starts falling is later than time t2 at which the voltage $V_{LX}$ starts rising. In other words, the gate turn-off transition of the low-side switch $T_{LS}$ occurs later than a rising $V_{LX}$ transition. The output out2 of the timing module 310 outputs a pulse of pulse width (t1-t2) at the output out2, and the output out1 of the timing module 310 is low. The output voltage of the charge pump 312 decreases proportionally to the pulse width (t1-t2). The delay module 304 decreases the delay of the rising edge of the PWM pulse proportionally to the decrease in the output voltage of the charge pump 312. Over several cycles (i.e., PWM pulses) the amount of delay continues to decrease until a time difference between the times t1 and t2 becomes nearly zero.

At this point, the dead time during the turn-on transitions of the converter 300 is nearly zero when the inductor current $I_L$ flows out of the junction of the switches at that time. In this manner, when the inductor current $I_L$ flows out of the junction of the switches during the rising edges of the PWM pulses (i.e., during the turn on transitions of the converter 300), the feedback loop of the high-side switch $T_{HS}$ saturates, and the feedback loop of the low-side switch $T_{LS}$ adjusts (reduces) the dead time during the rising edges of the PWM pulse (i.e., during the turn-on transitions of the converter 300).

Now suppose that the high-side switch $T_{HS}$ is off, the low-side switch $T_{LS}$ is on, the delay modules 302 and 304 receive a rising edge of the PWM pulse to turn on the high-side switch $T_{HS}$, and the inductor current $I_L$ flows into the junction of the switches at that time. In the feedback loop of the low-side switch $T_{LS}$, the gate-to-source voltage of the low-side switch $T_{LS}$ falls before the voltage $V_{LX}$ can rise. Accordingly, at the inputs of the timing module 310, time t1 at which the gate-to-source voltage of the low-side switch $T_{LS}$ starts falling is before time t2 at which the voltage $V_{LX}$ starts rising. In other words, the gate turn-off transition of the low-side switch $T_{LS}$ occurs earlier than a rising $V_{LX}$ transition. The output out1 of the timing module 310 outputs a pulse of pulse width (t2-t1) at the output out1, and the output out2 of the timing module 310 is low. The output voltage of the charge pump 312 increases proportionally to the pulse width (t2-t1). The delay module 304 delays the rising edge of the PWM pulse proportionally to the increase in the output voltage of the charge pump 312. The process continues until the output voltage of the charge pump 312 rails at $V_{dd}$. The amount of delay continues to increase and reaches a maximum value when the output voltage of the charge pump 312 rails at $V_{dd}$. At this point the feedback loop of the low-side switch $T_{LS}$ is saturated.

In the feedback loop of the high-side switch $T_{HS}$, the gate-to-source voltage of the high-side switch $T_{HS}$ is falling, and the voltage $V_{LX}$ is rising. Suppose that at the inputs of the timing module 202, time t1 at which the gate-to-source voltage of the high-side switch $T_{HS}$ starts falling is later than time t2 at which the voltage $V_{LX}$ starts rising. In other words, the gate turn-on transition of the high-side switch $T_{HS}$ occurs later than a rising $V_{LX}$ transition. The output out2 of the timing module 202 outputs a pulse of pulse width (t1-t2) at the output out2, and the output out1 of the timing module 202 is low. The output voltage of the charge pump 204 decreases proportionally to the pulse width (t1-t2). The delay module 302 decreases the delay of the rising edge of the PWM pulse proportionally to the decrease in the output voltage of the charge pump 204. Over several cycles (i.e., PWM pulses) the amount of delay continues to decrease until a time difference between the times t1 and t2 becomes nearly zero.

At this point, the dead time during the turn-on transitions of the converter 300 is nearly zero when the inductor current $I_L$ flows into the junction of the switches at that time. In this manner, when the inductor current $I_L$ flows into the junction of the switches during the rising edges of the PWM pulse (i.e., during the turn-on transitions of the converter 300), the feedback loop of the low-side switch $T_{LS}$ saturates, and the feedback loop of the high-side switch $T_{HS}$ adjusts (reduces) the dead time during the rising edges of the PWM pulse (i.e., during the turn-on transitions of the converter 300).

Similar analysis can be obtained during a turn-off transition of the converter 300 (i.e., when a falling edge of a PWM pulse is output to turn off the high-side switch $T_{HS}$). The delays generated by the delay modules 302 and 304 adjust (reduce) the dead times when the converter 300 operates in various modes irrespective of load conditions as shown in FIGS. 4B-4D.

In summary, the timing module 306 senses a time difference between a time at which the voltage $V_{LX}$ transitions and begins to fall and a time at which the gate-to-source voltage of the high-side switch $T_{HS}$ transitions and begins to rise (i.e., the gate turn-off transition of the high-side switch $T_{HS}$). The delay module 302 delays the gate turn-off transition of the high-side switch $T_{HS}$ by delaying the falling edge of the PWM pulse based on the time difference to reduce this time difference, i.e., the dead time.

The timing module 202 senses a time difference between a time at which the voltage $V_{LX}$ transitions and begins to rise and a time at which the gate-to-source voltage of the high-side switch $T_{HS}$ transitions and begins to fall (i.e., the gate turn-on transition of the high-side switch $T_{HS}$). The delay module 302 delays the gate turn-on transition of the high-side switch $T_{HS}$ by delaying the rising edge of the PWM pulse based on the time difference to reduce this time difference, i.e., the dead time.

The timing module 310 senses a time difference between a time at which the voltage $V_{LX}$ transitions and begins to rise and a time at which the gate-to-source voltage of the low-side switch $T_{LS}$ transitions and begins to fall (i.e., the gate turn-off transition of the low-side switch $T_{LS}$). The delay module 304 delays the gate turn-off transition of the low-side switch $T_{LS}$ by delaying the rising edge of the PWM pulse based on the time difference to reduce this time difference, i.e., the dead time.

The timing module 210 senses a time difference between a time at which the voltage $V_{LX}$ transitions and begins to fall and a time at which the gate-to-source voltage of the low-side switch $T_{LS}$ transitions and begins to rise (i.e., the gate turn-on transition of the low-side switch $T_{LS}$). The delay module 304 delays the gate turn-on transition of the low-side switch $T_{LS}$ by delaying the falling edge of the PWM pulse based on the time difference to reduce this time difference, i.e., the dead time.

Figure 5A:
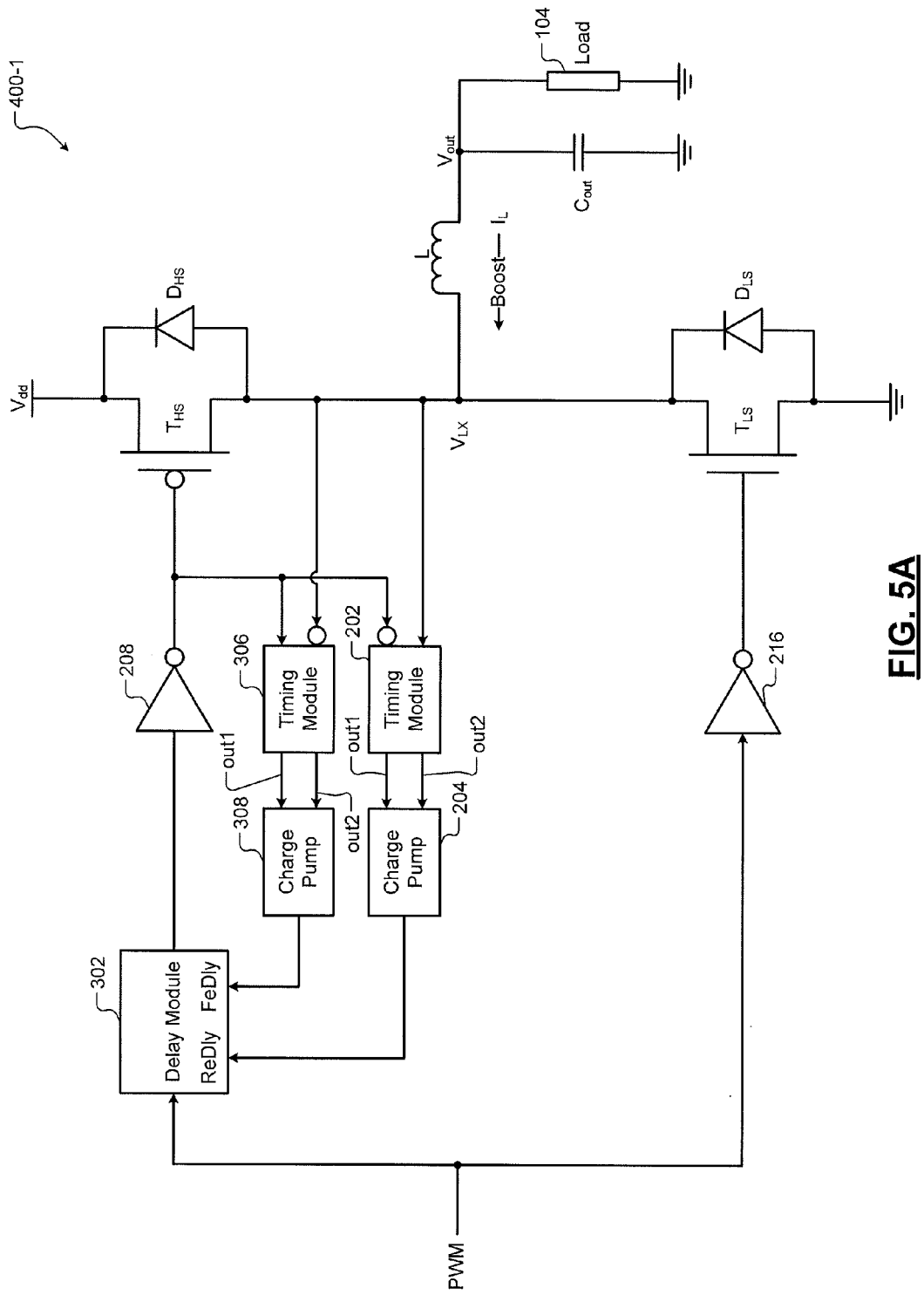
FIG. 5A is a schematic of a DC-to-DC converter according to the present disclosure that reduces dead times in Boost CCM using two feedback loops for a high-side switch of the converter.
Figure 5B:
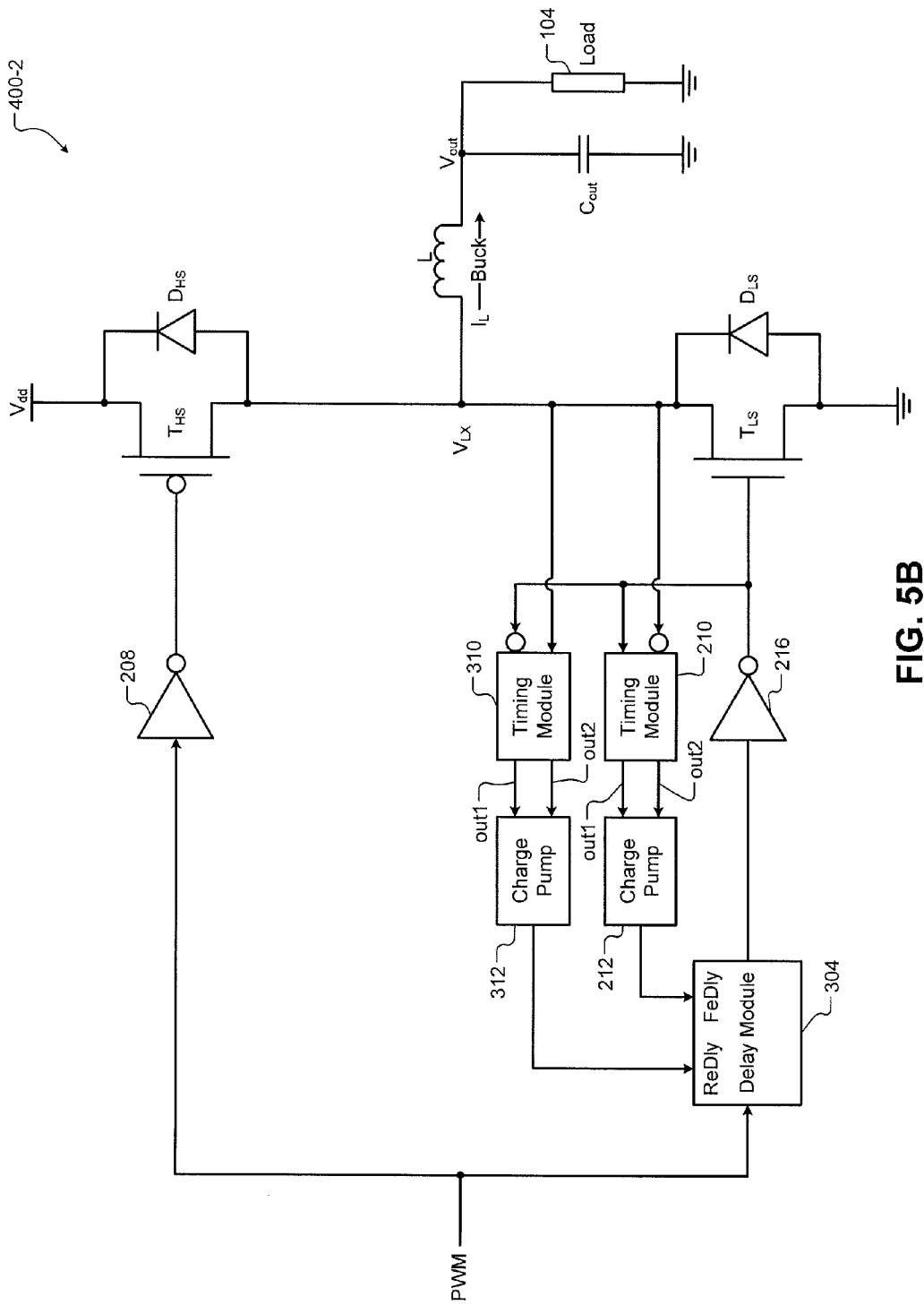
FIG. 5B is a schematic of a DC-to-DC converter according to the present disclosure that reduces dead times in Buck CCM using two feedback loops for a low-side switch of the converter.
Figure 5D:
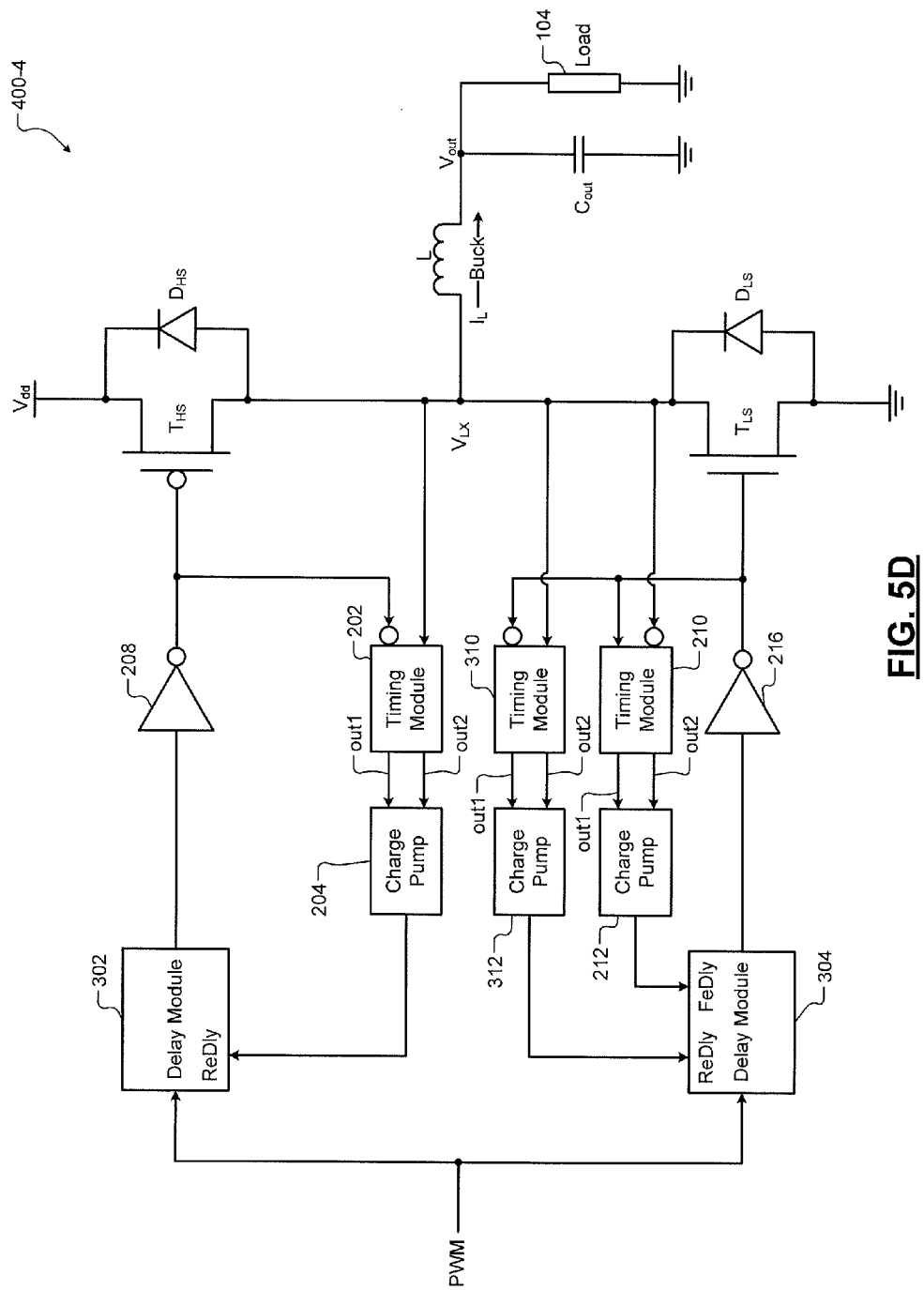
FIG. 5D is a schematic of a DC-to-DC converter according to the present disclosure that reduces dead times in Buck mode using one feedback loop for a high-side switch of the converter and two feedback loop for a low-side switch of the converter.

Referring now to FIGS. 5A-5D, additional converters that reduce dead times are shown. Each of the converters operates in a particular mode and reduces dead times in the particular mode using a plurality but not all of the feedback loops shown in FIG. 4A. For example, in FIG. 5A, a converter 400-1 operating in Boost CCM reduces dead times using only the delay module 302, the timing module 306, the charge pump 308, the timing module 202, and the charge pump 204. In FIG. 5B, a converter 400-2 operating in Buck CCM reduces dead times using only the delay module 304, the timing module 310, the charge pump 312, the timing module 210, and the charge pump 212. In FIG. 5C, a converter 400-3 operating in Boost mode reduces dead times using only the delay modules 302 and 304, the timing module 306, the charge pump 308, the timing module 202, the charge pump 204, the timing module 210, and the charge pump 212. In FIG. 5D, a converter 400-4 operating in Buck mode reduces dead times using only the delay modules 302 and 304, the timing module 202, the charge pump 204, the timing module 310, the charge pump 312, the timing module 210, and the charge pump 212.

Figure 6A:
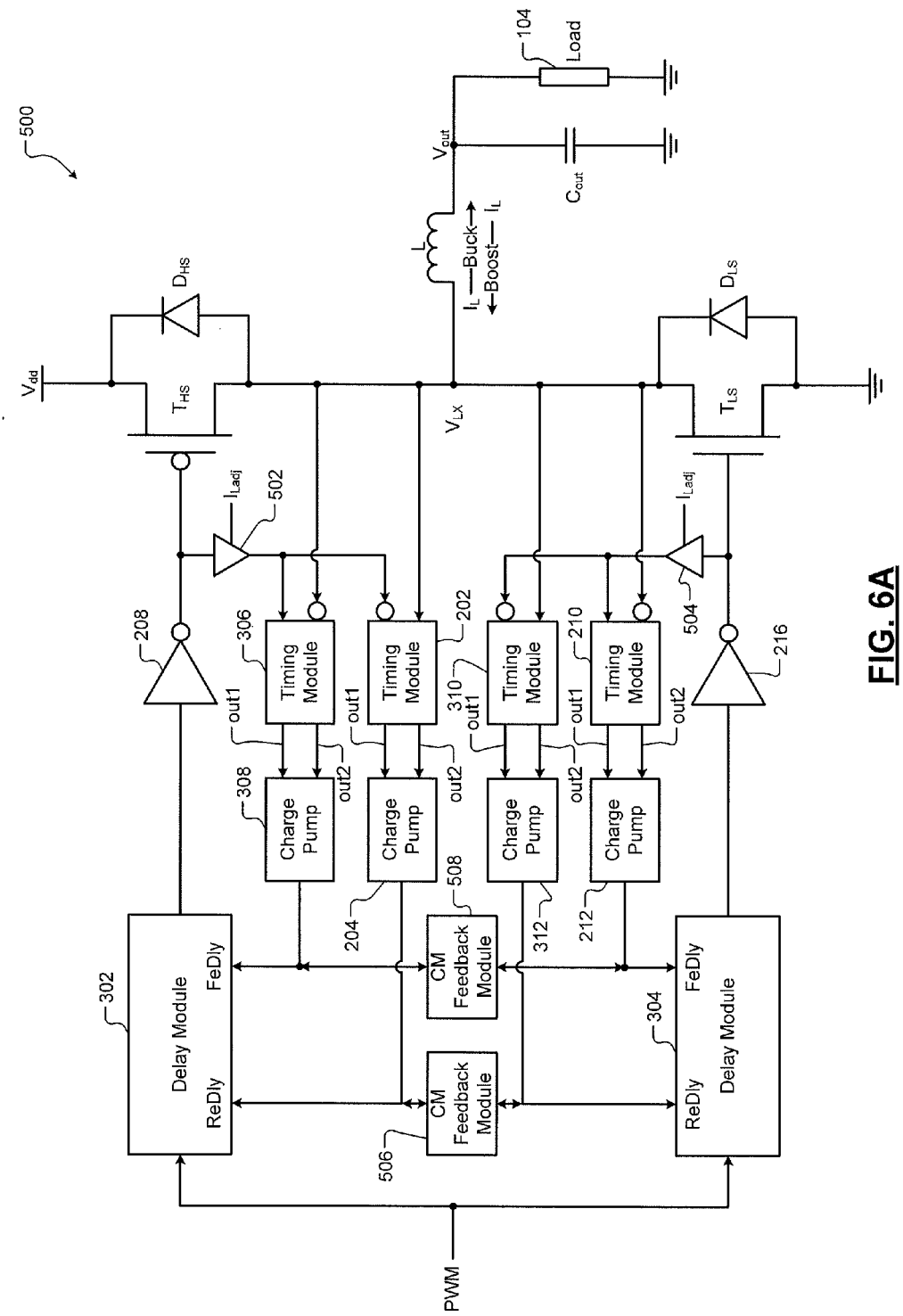
FIG. 6A is a schematic of the DC-to-DC converter of FIG. 4A further comprising gate sensors and common-mode feedback modules according to the present disclosure.
Figure 6B:
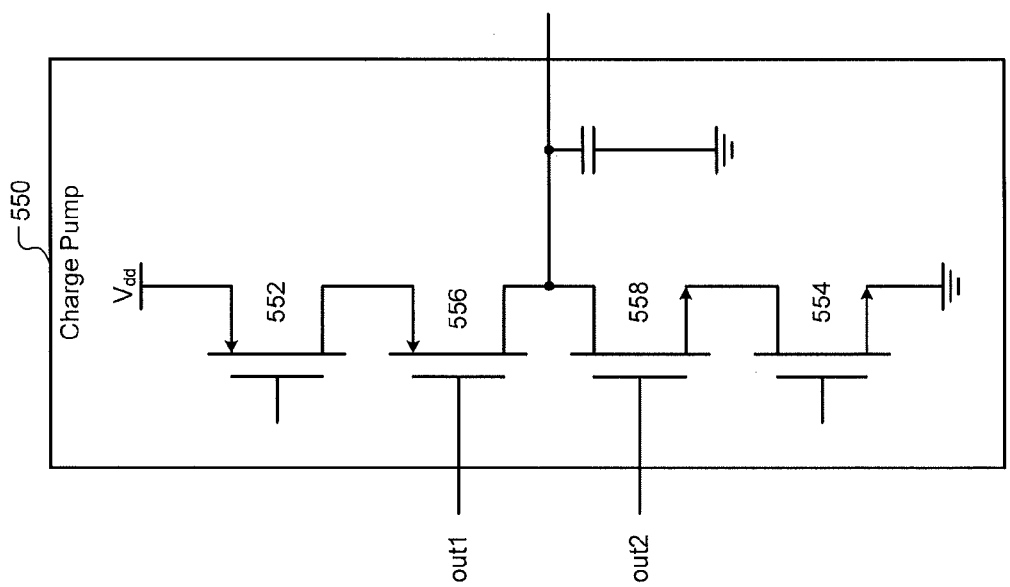
FIG. 6B is a schematic of a charge pump used in the DC-to-DC converter of FIG. 6A.

Referring now to FIGS. 6A and 6B, a converter 500 comprising a plurality of gate sensors and a plurality of common-mode feedback modules is shown. In FIG. 6A, the converter 500 includes all of the components of the converter 300 shown in FIG. 4A. The converter 500 further includes gate sensors 502 and 504 and common-mode feedback modules 506 and 508. The gate sensors 502 and 504 trip at gate-to-source voltages between the plateau voltages and gate-to-source threshold voltages of the high-side switch $T_{HS}$ and the low-side switch $T_{LS}$, respectively. The common-mode feedback modules 506 and 508 prevent the charge pumps from railing to $V_{dd}$.

A plateau voltage is defined in practice as the gate-to-source voltage at which the transistor delivers a current substantially equal to the inductor current. The gate-to-source threshold voltage is a gate-to-source voltage at which the transistor turns on.

The trip voltages of the gate sensors 502 and 504 may be adjusted between the plateau voltage and the gate-to-source threshold voltage based on the inductor current $I_L$. For example, for light load, the trip voltage may be set closer to the gate-to-source threshold voltage, and for heavy load, the trip voltage may be set farther from the gate-to-source threshold voltage and closer to the plateau voltage. The adjustment of the trip voltages of the gate sensors 502 and 504 based on the inductor current $I_L$ further compensates for variations in dead time as a function of load current.

In FIG. 6A, each of the common-mode feedback modules 506, 508 includes a circuit that functions as a charge-injecting common-mode voltage controller. These modules prevent the charge pumps from railing to $V_{dd}$ or ground.

In FIG. 6B, an example of a charge pump 550 is shown. The charge pump 550 includes current sources 552 and 554 and switches 556 and 558. The switches 556 and 558 of a charge pump (e.g., one of the charge pumps 308, 204, 312, or 212) are respectively connected to the outputs out1 and out2 of a corresponding timing module (e.g., one of the timing modules 306, 202, 310, or 210) to which the charge pump is connected.

Throughout the present disclosure, the high-side switch $T_{HS}$ is shown as a PMOS device, and the low-side switch $T_{LS}$ is shown as an NMOS device for example only. Instead, the high-side switch $T_{HS}$ can be an NMOS device, and the low-side switch $T_{LS}$ can be a PMOS device. Accordingly, while polarities of various signals including PWM pulses, voltages, and currents are discussed throughout the disclosure according to examples shown, the polarities will be opposite if the high-side switch $T_{HS}$ is an NMOS device, and the low-side switch $T_{LS}$ is a PMOS device instead.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A DC-to-DC converter comprising:
first and second switches that are connected to each other at a node, that are connected in series across first and second potentials, and that are biased by pulse-width modulated (PWM) pulses;
an inductance connected between the node and a load;
a timing module that determines a first time difference between a first edge of a first signal at the node and a first edge of a second signal at a control terminal of the first switch and that determines a second time difference between a second edge of the first signal at the node and a second edge of the second signal at the control terminal of the first switch, wherein the first and second edges of the second signal correspond to first and second edges of one of the PWM pulses, respectively;
a delay module that delays the first and second edges of the second signal at the control terminal of the first switch based on the first and second time differences, respectively; and
a charge pump that outputs a voltage,
wherein the delay module delays an edge of one of the PWM pulses based on an amount of change in the voltage output by the charge pump.

2. The DC-to-DC converter of claim 1 wherein:
the first and second edges of the first signal at the node are falling and rising edges, respectively;
the first and second edges of the second signal at the control terminal of the first switch are rising and falling edges, respectively; and
the first and second edges of the one of the PWM pulses are falling and rising edges, respectively.

3. The DC-to-DC converter of claim 1 wherein:
the voltage increases by an amount proportional to a difference between the first and second times in response to the first edge of the second signal at the control terminal of the first switch occurring at a first time and the first edge of the first signal at the node occurring at a second time that is later than the first time; and
the delay module delays the first edge of the one of the PWM pulses based on the amount of increase in the voltage.

4. The DC-to-DC converter of claim 1 wherein:
the voltage decreases by an amount proportional to a difference between the first and second times in response to the first edge of the second signal at the control terminal of the first switch occurring at a first time and the first edge of the first signal at the node occurring at a second time that is earlier than the first time; and the delay module delays the first edge of the one of the PWM pulses based on the amount of decrease in the voltage.

5. The DC-to-DC converter of claim 1 wherein:
the voltage increases by an amount proportional to a difference between the first and second times in response to the second edge of the second signal at the control terminal of the first switch occurring at a first time and the second edge of the first signal at the node occurring at a second time that is later than the first time; and
the delay module delays the second edge of the one of the PWM pulses based on the amount of increase in the voltage.

6. The DC-to-DC converter of claim 1 wherein:
the voltage decreases by an amount proportional to a difference between the first and second times in response to the second edge of the second signal at the control terminal of the first switch occurring at a first time and the second edge of the first signal at the node occurs at a second time that is earlier than the first time; and
the delay module delays the second edge of the one of the PWM pulses based on the amount of decrease in the voltage.

7. The DC-to-DC converter of claim 1 wherein:
the timing module determines a third time difference between the first edge of the first signal at the node and a first edge of a third signal at the control terminal of the second switch, wherein the first edge of the third signal corresponds to the first edge of the one of the PWM pulses; and
the delay module delays the first edge of the third signal at the control terminal of the second switch based on the third time difference and does not delay a second edge of the third signal at the control terminal of the second switch, wherein the second edge of the third signal corresponds to the second edge of the one of the PWM pulses.

8. The DC-to-DC converter of claim 7 wherein:
the first and second edges of the first signal at the node are falling and rising edges, respectively;
the first and second edges of the second signal at the control terminal of the first switch are rising and falling edges, respectively;
the first and second edges of the third signal at the control terminal of the second switch are rising and falling edges, respectively; and
the first and second edges of the one of the PWM pulses are falling and rising edges, respectively.

9. The DC-to-DC converter of claim 7 wherein:
the voltage increases by an amount proportional to a difference between the first and second times in response to the first edge of the third signal at the control terminal of the second switch occurring at a first time and the first edge of the first signal at the node occurring at a second time that is later than the first time; and
the delay module delays the first edge of the one of the PWM pulses based on the amount of increase in the voltage.

10. The DC-to-DC converter of claim 7 wherein:
the voltage decreases by an amount proportional to a difference between the first and second times in response to the first edge of the third signal at the control terminal of the second switch occurring at a first time and the first edge of the first signal at the node occurring at a second time that is earlier than the first time; and
the delay module delays the first edge of the one of the PWM pulses based on the amount of decrease in the voltage.

11. A DC-to-DC converter comprising:
first and second switches that are connected to each other at a node, that are connected in series across a supply voltage and a reference potential, and that are biased by pulse-width modulated (PWM) pulses;
an inductance connected between the node and a load;
a timing module that determines a first time difference between a first edge of a first signal at the node and a first edge of a second signal at a control terminal of the first switch, a second time difference between a second edge of the first signal at the node and a second edge of the second signal at the control terminal of the first switch, a third time difference between the second edge of the first signal at the node and a first edge of a third signal at the control terminal of the second switch, and a fourth time difference between the first edge of the first signal at the node and a second edge of the third signal at the control terminal of the second switch, wherein the first and second edges of the second signal and the second and first edges of the third signal respectively correspond to first and second edges of one of the PWM pulses;
a plurality of charge pumps that output respective voltages based on the first, second, third, and fourth time differences; and
a delay module that delays the first and second edges of the second signal at the control terminal of the first switch based on the first and second time differences, respectively, that delays the first and second edges of the third signal at the control terminal of the second switch based on the third and fourth time differences, respectively.

12. The DC-to-DC converter of claim 11, wherein the delay module delays one or more of the first and second edges of the one of the PWM pulses based on one or more of the first, second, third, and fourth time differences.

13. The DC-to-DC converter of claim 11, wherein:
the first and second edges of the first signal at the node are falling and rising edges, respectively;
the first and second edges of the second signal at the control terminal of the first switch are rising and falling edges, respectively;
the first and second edges of the third signal at the control terminal of the second switch are falling and rising edges, respectively; and
the first and second edges of the one of the PWM pulses are falling and rising edges, respectively.

14. The DC-to-DC converter of claim 11 further comprising a feedback module that senses a plurality of the voltages output by the charge pumps, that computes an average voltage of the plurality of the voltages, and that injects a charge into the outputs of the respective charge pumps, wherein the charge is based on a difference between the average voltage and the supply voltage.

15. The DC-to-DC converter of claim 11 further comprising a sensor that senses current through the inductance and that outputs the second signal in response to a control voltage at the control terminal of the first switch being greater than or equal to a predetermined voltage, wherein the predetermined voltage is set between a threshold voltage at which the first switch turns on and a plateau voltage of the first switch depending on the load.

16. The DC-to-DC converter of claim 11 further comprising a sensor that senses current through the inductance and that outputs the third signal in response to a control voltage at the control terminal of the second switch being greater than or equal to a predetermined voltage, wherein the predetermined voltage is set between a threshold voltage at which the second switch turns on and a plateau voltage of the second switch depending on the load.

* * * * *